(12) United States Patent
Schreckenberg et al.

(10) Patent No.: US 9,599,266 B2
(45) Date of Patent: Mar. 21, 2017

(54) EXTERNALLY SEALING CONNECTOR

(75) Inventors: Christoph Schreckenberg, Attendorn (DE); Oliver Cyliax, Siegen (DE)

(73) Assignee: Viega GmbH & Co. KG, Attendorn (DE)

( * ) Notice: Subject to any disclaimer, the term of this patent is extended or adjusted under 35 U.S.C. 154(b) by 518 days.

(21) Appl. No.: 12/543,777

(22) Filed: Aug. 19, 2009

(65) Prior Publication Data

US 2010/0164222 A1   Jul. 1, 2010

(30) Foreign Application Priority Data

Aug. 20, 2008 (DE) .................. 10 2008 038 480

(51) Int. Cl.
| | | |
|---|---|---|
| *F16L 19/06* | (2006.01) | |
| *F16L 37/091* | (2006.01) | |
| *F16L 37/092* | (2006.01) | |

(52) U.S. Cl.
CPC ......... *F16L 37/091* (2013.01); *F16L 37/0925* (2013.01)

(58) Field of Classification Search
CPC ...... F16L 37/091; F16L 37/0925; F16L 47/12
USPC ......... 285/148.22, 148.23, 148.26, 324, 383, 285/340, 104, 322, 354, 243, 345, 323
See application file for complete search history.

(56) References Cited

U.S. PATENT DOCUMENTS

| | | | | |
|---|---|---|---|---|
| 2,346,051 A | * | 4/1944 | Seamark ................... | 285/339 |
| 2,410,027 A | * | 10/1946 | Guildford ................. | 285/339 |
| 4,722,558 A | * | 2/1988 | Badoureaux ......... | F16L 37/091 |
| | | | | 285/242 |
| 4,878,697 A | * | 11/1989 | Henry ...................... | 285/250 |
| 2005/0035597 A1 | * | 2/2005 | Bamberger et al. ....... | 285/340 |
| 2009/0033090 A1 | * | 2/2009 | Stoll et al. ................ | 285/317 |

FOREIGN PATENT DOCUMENTS

| | | |
|---|---|---|
| AT | 270314 | 4/1969 |
| CH | 442 899 | 8/1967 |
| EP | 2108875 | 10/2009 |
| GB | 2 294 990 | 5/1996 |
| WO | 02/16817 | 2/2002 |
| WO | 02/070940 | 9/2002 |
| WO | WO 2006105849 A1 * | 10/2006 |

* cited by examiner

*Primary Examiner* — Aaron Dunwoody
(74) *Attorney, Agent, or Firm* — The Webb Law Firm

(57) ABSTRACT

A connector, particularly for connecting pipes, includes a base body, a sealing element and a member for fixing a pipe inserted into the connector, wherein the base body has an insertion opening on one side for the insertion of a pipe and the sealing element is arranged in an essentially cylindrically symmetrical recess set embedded in the base body and wherein the essentially cylindrically symmetrical recess at least partly has a smaller depth in the region between the position of the inset sealing element and the side of the recess facing the insertion opening of the base body than in the region of the position of the sealing element.

7 Claims, 7 Drawing Sheets

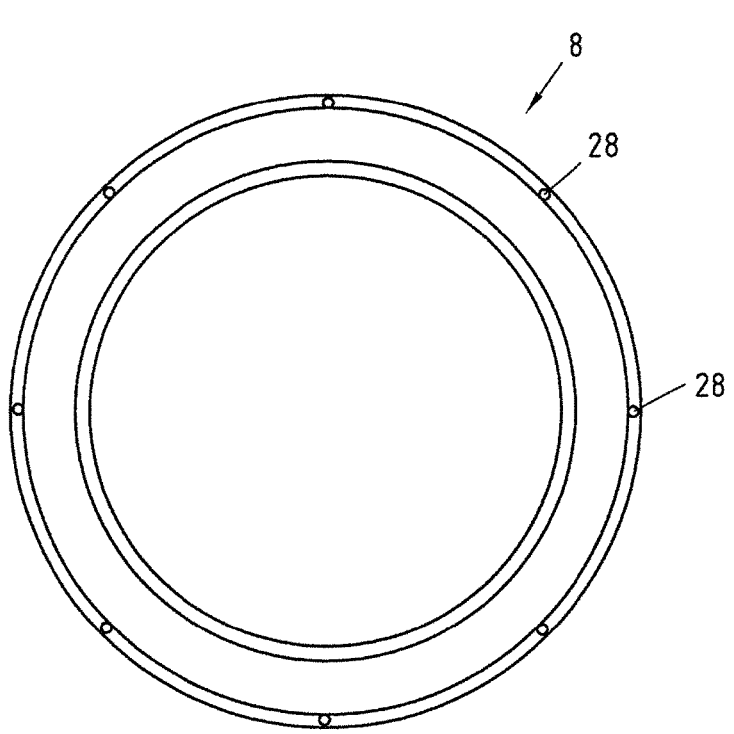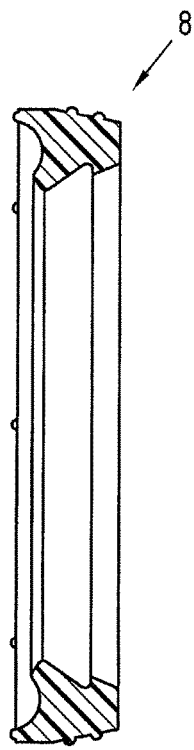
Fig.2a  Fig.2b
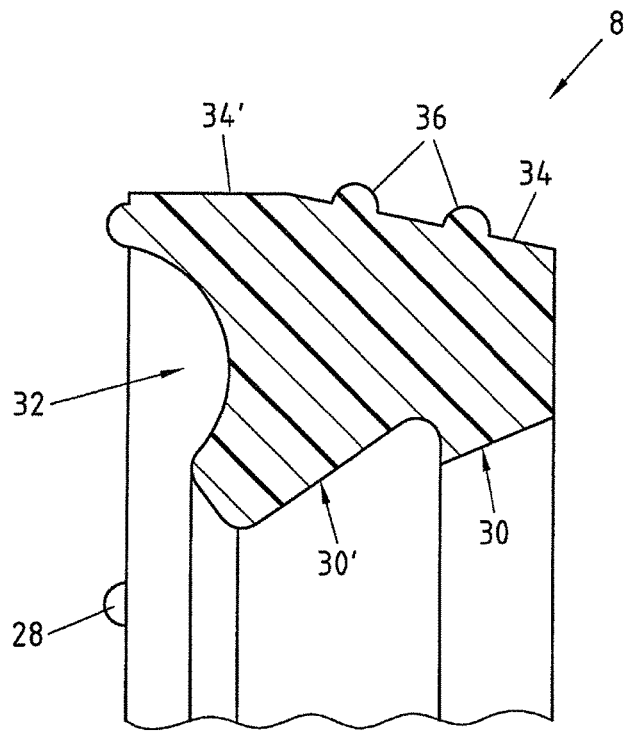
Fig.2c

Fig.5a                                       Fig.5b

//EXTERNALLY SEALING CONNECTOR

CROSS-REFERENCE TO RELATED APPLICATION

This application claims the benefit of and priority to German patent application no. DE 10 2008 038 480.1-24, filed on Aug. 20, 2008. The disclosure of the above application is incorporated herein by reference in its entirety.

FIELD OF THE INVENTION

The invention relates to a connector, particularly for connecting pipes, with a base body, a sealing element and with a fixing means for fixing a pipe inserted into the connector, wherein the base body has an insertion opening on one side for the insertion of a pipe and the sealing element is arranged in an essentially cylindrically symmetrical recess embedded in the base body. The invention additionally relates to a connector, particularly for connecting pipes, with a base body, a sealing element and a fixing means for fixing a pipe inserted into the connector, wherein the base body has an insertion opening on one side for the insertion of a pipe, the fixing means has an essentially rotationally symmetrical clamping element and a cutting element and at least one tooth pointing in a direction facing away from the insertion opening of the base body is formed on the inner side of the clamping element, wherein the cutting edge of the cutting element points in the direction facing away from the insertion opening of the base body and the cutting element is arranged on the side of the clamping element facing away from the insertion opening of the base body.

BACKGROUND

When installing pipeline systems, for example in the case of building service related water supply, pipes must often be connected to further pipes, valves, distribution elements, etc. These connections must on the one hand be leak-proof and secure, on the other hand they must exhibit a long durability as the exchanging of connections causes high work outlay and high costs, particularly in the case of flush-mounted pipe systems. At the same time, such a connection should also be simple and quick to install, however.

In the prior art, connecting elements are known to this end, using which pipes can be connected in such a manner that after insertion of the pipes into the connecting element, a force is exerted onto the connecting element from outside and thus the connection of pipe and connecting element is achieved by pressing.

These connecting elements have the disadvantage that an additional tool is required to exert the pressing force. This can lead to the situation that such connecting elements can not be used on account of the lack of space for the additional tool.

Furthermore, connectors are known from the prior art, in the case of which a pipe is inserted into the connector and the pipe is held in the connector by fixing means without pressing of the connector and the pipe from the outside having to take place. In the prior art, an O ring is often arranged between the connector and the pipe as a sealing element to seal the connection. To install such connectors, the pipe must first be cut to length, deburred, chamfered from the outside and calibrated in relation to the connector, before it can be inserted into the connector. The deburring and chamfering are required in this case so that the sealing element is not damaged by the edge of the pipe end or pushed out of the intended position. These connectors therefore have the disadvantage that they require a multiplicity of work steps on the pipe before the pipe can be inserted into the connector.

These connectors additionally have the disadvantage that they have a less reliable and less long lasting leak-proofness than the connections achieved with pressed connecting elements as the sealing elements are pressed, tensioned or fixed in some other manner between the pipe and connector less strongly. Furthermore, the pipe is only moderately stabilized by the fixing means, so that undesirably large shifts between pipe and connector can occur, principally in the case of pressure surges in the pipe.

In the prior art, connectors are furthermore known whose fixing means have metal cutting edges pointing in the direction of the end of the inserted pipe, which metal cutting edges cut into the pipe material.

These metal cutting edges have the disadvantage that they cut deeper and deeper into the pipe material in the event of strong pressure surges and thus in the event of movements of the pipe in the connector and can thus locally perforate or even shear off the pipe.

SUMMARY OF THE INVENTION

The invention is therefore based on the technical problem of specifying a connector which has a reliable leak-proofness and durability and in the case of which the installation of the connector can be carried out in a simplified and thus accelerated manner. The invention is additionally based on the technical problem of specifying a connector, in the case of which the pipe is securely fixed in the connector and in the case of which damaging of the pipe which brings about a leak and is caused by the fixing means is ruled out.

At least one of the previously mentioned technical problems is solved according to a connector including a base body, a sealing element, and a fixing means for fixing a pipe inserted into the connector, wherein the base body has an insertion opening on one side for the insertion of a pipe, wherein the sealing element is arranged in an essentially cylindrically symmetrical recess embedded in the base body, and wherein the essentially cylindrically symmetrical recess to at least a partial extent has a smaller depth in the region between the position of the inset sealing element and a side of the recess facing the insertion opening of the base body than in the region of the position of the sealing element.

By the fact that the essentially cylindrically symmetrical recess at least partly has a smaller depth in the region between the position of the embedded sealing element and the side of the recess facing the insertion opening of the base body than in the region of the position of the sealing element it is achieved that the sealing element, in the event of loading with internal pressure at its side facing away from the insertion opening of the base body, is moved axially by the pressure into a region of the recess with smaller depth and thereby is compressed in the radial direction, as a result of which the contact pressure of the sealing element on the base body and on the adjacent pipe wall increases, so that the gap located between the base body and the inserted pipe is sealed by the sealing element with increased force closure compared to the previous position.

Loading with internal pressure is understood to mean loading with pressure of the pipe by means of the medium conveyed in the pipe.

Cylindrically symmetrical here designates rotational symmetry about a certain axis, wherein the certain axis is understood to mean the coaxial axis of the pipe inserted into the connector. This axis is furthermore also understood to mean the axial axis of the cylinder coordinates, to which the terms "axial", "radial" and "azimuthal" used in the following relate.

A further advantageous configuration of the connector results from the depth of the recess substantially decreasing from the side facing away from the insertion opening to the side facing the insertion opening.

By this configuration it is achieved that the sealing element, in the event of greater application of internal pressure on the side facing away from the insertion opening of the base element, is correspondingly radially compressed to a greater extent due to a corresponding greater axial shift, so that the greater force closure between sealing element, base body and the pipe wall adjacent to the sealing element, required for the leak-proofness in the event of greater pressure, is achieved. As a result, a long-term tensioning of the sealing element is enabled even in the case of pressure fluctuations.

A further advantageous embodiment of the connector is achieved in that the cross section of the sealing element has a substantially concave shape on the side facing away from the insertion opening of the base body. What is understood by a concave shape in this case is a shape in the case of which the shortest connecting line between two edge points of the shape runs outside of the shape.

By this shaping it is achieved that the force exerted on the sealing element as a result of the pressure loaded on the concave side additionally presses the sealing element in the radial direction against the base body and the adjacent pipe wall.

A further preferred embodiment of the connector is achieved in that the cross section of the sealing element essentially has a shape similar to a wedge, wherein the narrower part of the shape in the radial direction is arranged on the side facing the insertion opening of the base body.

The advantage of this shaping lies in the fact that the shape of the sealing element is better adapted to the shape of the base of the recess, so that the surface of the sealing element bearing against the base body and against the pipe wall is increased. A further advantage of this shaping lies in the fact that due to the smaller thickness of the sealing element on the side facing the insertion opening of the base body, the sealing element can be spread more easily on this side and thus the insertion of a pipe is facilitated.

A further preferred embodiment of the connector is achieved in that the sealing element has at least one inwardly directed bearing surface which runs at an angle to the radial direction.

The advantage of this embodiment lies in the fact that, even in the case of an essentially rectangular cut edge of the pipe to be inserted, a radial force occurs for spreading the sealing element, so that the sealing element cannot be pushed out of the recess during the insertion of such a pipe. This is an important advantage compared with the previous prior art, as deburring and chamfering of the pipe which has been cut to length are no longer required. This leads to a simplification and to a shortening of the installation procedure.

A further preferred embodiment of the connector results from the inwardly directed bearing surface being constructed as an inwardly directed lip which points in the direction facing away from the insertion opening of the base body.

This embodiment is advantageous, as the effort required in order to push the lip outwards when inserting a pipe, particularly a non-deburred and non-chamfered pipe, and thus to enable the passage of the pipe through the sealing element is smaller than the effort required to compress the sealing element in order to achieve a comparable expansion of the internal diameter of the sealing element. Furthermore, the force exerted by the insertion of the pipe essentially acts on the lip of the sealing element so that an undue shift of the sealing element is prevented during the insertion procedure. A slight shift of the sealing element is however possible and even advantageous, as the force exerted on the lip for inserting the pipe is reduced.

The construction of the inwardly directed bearing surface as a lip can be combined in a particularly preferred manner with the substantially concave shape of the cross section of the sealing element on the side facing away from the insertion opening of the base body. In this manner, the concave shape can be formed to some extent by the inwardly directed lip so that the lip does not have to be compressed to such a great extent during the insertion of the pipe, but rather is bent partially into the concave region. As a result, the effort required for the insertion is reduced.

A further advantageous configuration of the connector is achieved in that the side of the sealing element facing the base of the recess has a substantially convex shape. What is understood by a convex shape in this case is a shape in the case of which the shortest connecting line between two edge points of the shape runs within the shape.

This configuration has the advantage that the sealing element is tilted in such a manner during the insertion of a pipe that the cut edge of the pipe end and the bearing surface of the sealing element at the cut edge of the pipe end lie at a lower angle to one another. As a result, the effort required for passing the pipe end through the sealing element is reduced and the danger that the sealing element is pushed out of its position is further reduced.

In a particularly preferred embodiment of the connector, the side of the sealing element facing the base of the recess has at least two surfaces which lie at an angle with respect to one another.

The advantage of this embodiment lies in the fact that the sealing element, during the insertion of the pipe, tilts in a defined manner at a certain insertion depth by a defined angle so that the angle between the cut edge of the pipe end and the bearing surface of the sealing element at the cut edge of the pipe end can be reduced in a defined manner.

At least one of the technical problems mentioned above is furthermore solved by a connector which has a base body, a sealing element, and a fixing means for fixing a pipe inserted into the connector; wherein the base body has an insertion opening on one side for the insertion of a pipe, wherein the fixing means has an essentially rotationally symmetrical clamping element and a cutting element, wherein at least one tooth pointing in a direction facing away from the insertion opening of the base body is formed on an inner side of the clamping element, wherein a cutting edge of the cutting element points in the direction facing away from the insertion opening of the base body, wherein the cutting element is arranged on a side of the clamping element facing away from the insertion opening of the base body, and wherein the clamping element has an angled stop surface pointing in a direction of the cutting element and the cutting element bears against the stop surface.

By the fact that the clamping element has an angled stop surface pointing in the direction of the cutting element and the cutting element bears against this stop surface a twist inwards of a part of the cutting element having the cutting edge is prevented so that the cutting element can only cut into the pipe wall up to a certain depth and damaging or shearing off of the pipe is prevented. This is particularly important in the case of sudden pressure surges or externally applied shocks which lead to a relative movement between the pipe and the connector.

A further advantageous embodiment is achieved in that the cross section of the cutting element has an angled shape.

By this shape of the cutting element a twist inwards of the cutting element is prevented particularly effectively due to the projection of the clamping element bearing against it. Furthermore, due to such a shape of the cutting element the cutting element is held particularly securely in its intended position next to the clamping element, particularly in the case of jerky relative movements between the pipe and the connector. The cutting element and the clamping element thus remain in bearing contact with one another.

A particularly preferred embodiment of the connector is achieved in that the cutting edge of the cutting element is constructed on radially distributed projections.

This embodiment has the advantage that the passage of a pipe through the cutting element is simplified, as no stretching of the material of the cutting element is required in this case, but only a bending of the projections is required in order to increase the internal radius of the cutting element. It is furthermore advantageous that the material of the cutting element does not have to be stretched, but only bent or folded for the angled orientation of the cutting edge during the production process. As a result, the production process is simplified and irregularities in the material due to stretching are avoided. Additionally, the cutting edge on the projections can be constructed in an advantageous, for example rounded, shape.

A further advantageous embodiment of the connector is achieved in that the outer surface of the clamping element and the inner surface of the base body bearing against it have tapers pointing in the direction facing the insertion opening of the base body.

This embodiment has the advantage that the clamping element is held in its intended position by a form fit with the base body. During a relative movement, particularly during a jerky relative movement of the pipe end with respect to the base body in the direction of the insertion opening of the base body, the clamping element, if appropriate after a small relative movement in the direction of the insertion opening of the base body, is held in its position in the tapered region by the base body additionally still in a force locking manner. The radially inwardly directed part of the force transmitted from the base body to the clamping element in the region of the tapering additionally leads to a compression of the clamping element, so that the inwardly directed at least one tooth of the clamping element is pressed against the pipe more strongly and therefore fixes the latter more strongly and acts against the relative movement.

By the fact that the sealing element is constructed so that the essentially cylindrically symmetrical recess, at least to a partial extent, has a smaller depth in the region between the position of the inset sealing element and a side of the recess facing the insertion opening of the base body than in the region of the position of the sealing element and the clamping element and the cutting element are constructed so that the clamping element has an angled stop surface pointing in a direction of the cutting element and the cutting element bears against the stop surface, in addition to the advantages of the corresponding claims mentioned above, the synergy effect is achieved that the position of the sealing element shifted into a region of the recess with smaller depth by loading with internal pressure and the thus-achieved more reliable and more long lasting leak-proofness is even maintained in the event of fluctuating strength of the pressure, as pressure-induced relative movements between the pipe and the base body, which relative movements can shift the position of the sealing element, are largely ruled out by the fixing means.

BRIEF DESCRIPTION OF THE DRAWINGS

Further features and advantages of the present invention are explained in more detail in the description of the exemplary embodiments, wherein reference is made to the attached drawings. In the drawings FIG. 2a shows the annular sealing element from FIG. 1 in a plan view, FIG. 2b shows the annular sealing element from FIG. 1 in sectional view, FIG. 2c shows a detailed view of the sealing element from FIG. 1 in sectional view, FIG. 5a shows the annular cutting element from FIG. 1 in a plan view, FIG. 5b shows the annular cutting element from FIG. 1 in sectional view.

DESCRIPTION

Figure 1:
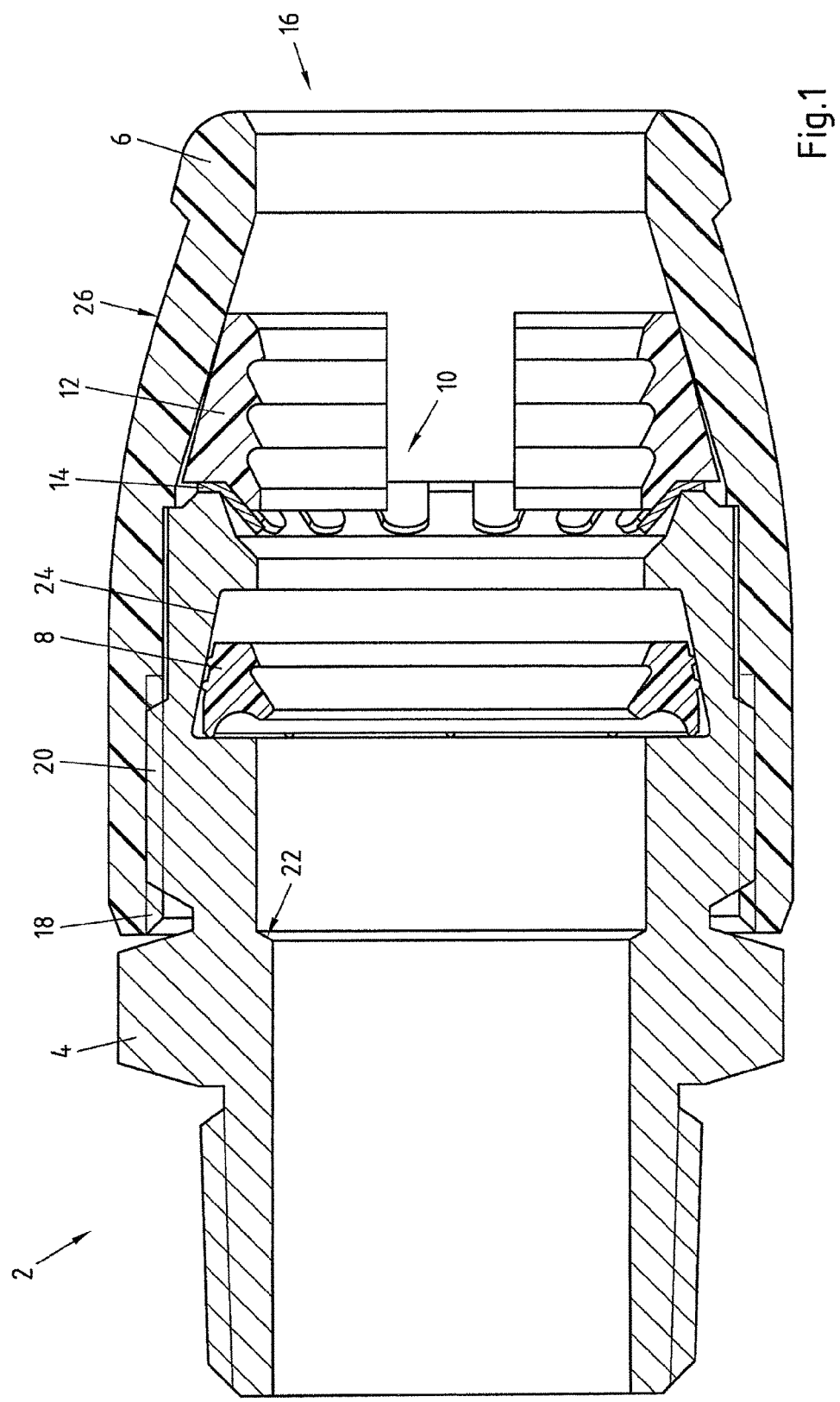
FIG. 1 shows an exemplary embodiment of a connector according to the invention in sectional view with a base body, wherein the base body has a separate sleeve, a sealing element and a fixing means, consisting of a clamping element and a cutting element.

FIG. 1 shows an exemplary embodiment of a connector 2 according to the invention in sectional view with a two-part base body, which consists of an inner body 4 and a separate sleeve 6, with a sealing element 8 and with a fixing means 10 consisting of a clamping element 12 and a cutting element 14. The base body 4,6 has an insertion opening 16 on the one side, which in this exemplary embodiment is located in the region of the sleeve 6 and which essentially corresponds in terms of its inner cross section with the outer cross section of the pipe to be inserted. The sleeve 6 has an inner thread 18 and is screwed to the inner body 4 of the base body, which has a corresponding outer thread 20. Alternatively, the sleeve 6 and the inner body 4 can also be pinned, clipped or releasably or non-releasably connected to one another in some other manner. The inner body 4 has a stop surface 22 which comes into contact with the end of an inserted pipe and thus defines the insertion depth of the pipe. The sleeve 6 in this case has a length which corresponds to the insertion depth of the pipe, so that the end opposite the insertion opening 16 of the sleeve 6, which sleeve is connected to the inner body 4, coincides in the axial direction with the position of the stop surface 22. This has the advantage that the insertion depth of the pipe can be determined very simply before the insertion by taking a length of the sleeve 6 from the end of the pipe to be inserted. This enables the pipe to be cut to length particularly quickly in particular. A recess 24 is furthermore provided in the inner body 4, the depth of which recess decreases evenly from the side facing away from the insertion opening 16 to the side facing the insertion opening 16. The sealing element 8 is arranged in the recess 24. The cutting element 14 and the conically tapering clamping element 12 are arranged on the side of the sealing element 8 facing the insertion opening. The sleeve 6 has a conical taper 26 which corresponds to the clamping element 12 in the region of the clamping element 12. A detailed description of the individual components and their function is to be drawn from the illustrations described in the following.

FIG. 2a and FIG. 2b show a longitudinal and a transverse section of the annular sealing element 8 illustrated in FIG. 1. The sealing element has projections 28 distributed on the circumference, which projections serve as spacers between the sealing element 8 and the edge of the recess 24, so that the medium conveyed in the pipe can make it into the region between the edge of the recess 24 and the sealing element 8 in the event of a loading with internal pressure.

FIG. 2c shows a detailed view of the sealing element 8 in sectional view. The sectional view of the sealing element 8 has a shape similar to a wedge. Two lips 30 and 30' are constructed on the inner side. A recess 32 is constructed on the side of the sealing element 8 facing away from the insertion opening, so that this side of the sealing element 8 has a concave shape. The side of the sealing element 8 facing the recess 24 of the inner body 4 has two surfaces 34 and 34', which lie at an angle to one another and allow the tilting of the sealing element 8 from the bearing of the surface 34 to the bearing of the surface 34' on the recess 24. Alternatively, a configuration of the side of the sealing element 8 facing the recess 24 of the inner body 4 as a straight conical surface is also conceivable. Elevations 36 are furthermore provided on the surface 34, which elevations further facilitate the tilting of the sealing element 8.

Embodiments of the recess 24, 24', 24", 24''' of the inner body 4 as well as embodiments of the sealing element 8', 8", 8''' are illustrated in FIGS. 3a to 3f. The insertion opening 16 (not shown) of the base body 4,6 is in each case arranged on the right side.

Figure 3A:
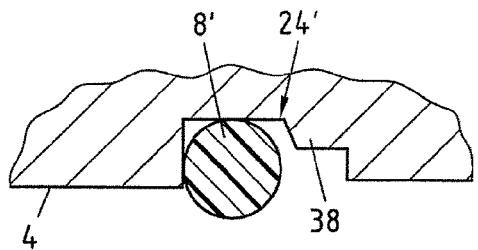
FIGS. 3a-f show further exemplary embodiments according to the invention of the sealing element and the recess in the base body accommodating the sealing element in cross section.
Figure 3B:
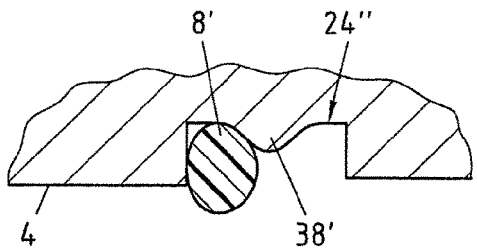

The exemplary embodiments of the recess 24', 24" shown in FIGS. 3a and 3b have elevations 38, 38' which narrow the internal radius of the inner body 4 in sections in the region of the recess. The sealing element 8' arranged on the left of the elevation 38, 38' is therefore compressed in the case of a movement to the right, so that the pressure of the sealing element 8' on the base of the recess 24', 24" and on the wall of the pipe (not shown) inserted from the right into the base body (4,6) increases.

Figure 3C:
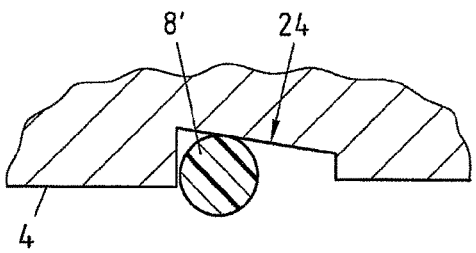
Figure 3D:
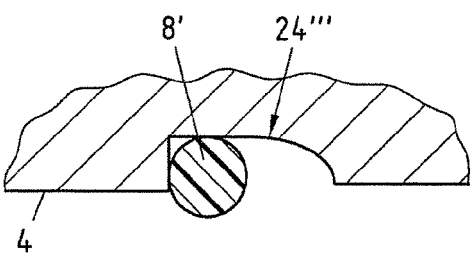

The exemplary embodiments of the recess 24, 24''' shown in FIGS. 3c and 3d show an even and a curved flattening of the recess 24, 24''' from left to right. The sealing means 8' inserted on the left side of the recess 24, 24''' is thus continuously compressed, particularly in the case of the move to the right induced by loading with internal pressure (on the left) onto the sealing means 8'. This leads to a steady increase in the contact pressure of the sealing element 8' onto the base of the recess 24, 24''' and onto the wall of the inserted pipe (not shown) in the event of an increase in the pressure surge onto the sealing element 8' on the left. With the gradual reduction of the internal radius of the base body in the region of the recess 24, 24''' it is therefore achieved that the sealing element 8' reliably seals the connector, even at various pressures applied.

Figure 3E:
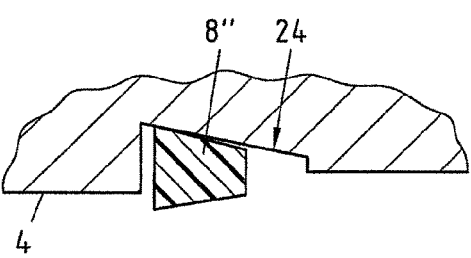
Figure 3F:
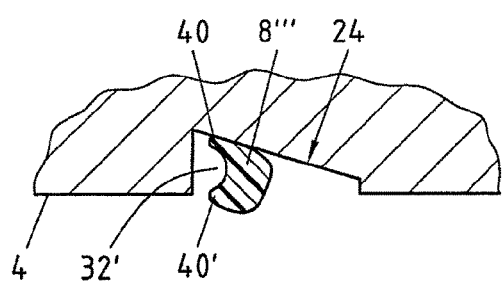

Exemplary Embodiments of the sealing element 8", 8''' are illustrated in FIGS. 3e and 3f. In FIG. 3e, the sealing element 8" is constructed in a wedge-like shape. This shape is adapted to the shape of the recess 24 in an advantageous manner. The contact surface between the sealing element 8" and the base of the recess 24 is therefore enlarged, so that the leak-proofness of the connection is more reliable and more long-term. In FIG. 3f, a recess 32' is embedded in the left side of the sealing element 8''', so that the sealing element 8''' has a concave shape which is delimited by two lips 40 and 40'. In the case of loading with pressure on the left side of the sealing element 8''', the lips of the sealing element 8''' are pressed against the base of the recess 24 or, respectively, against the wall of the pipe (not shown), so that the medium bringing about the pressure surge cannot make it between the bearing surface of the sealing element 8''' and the recess 24 or the pipe, respectively. This shape of the sealing element 8''' also benefits the force brought about by the pressure loading and acting towards the right on the sealing element 8'''.

Figure 4A:
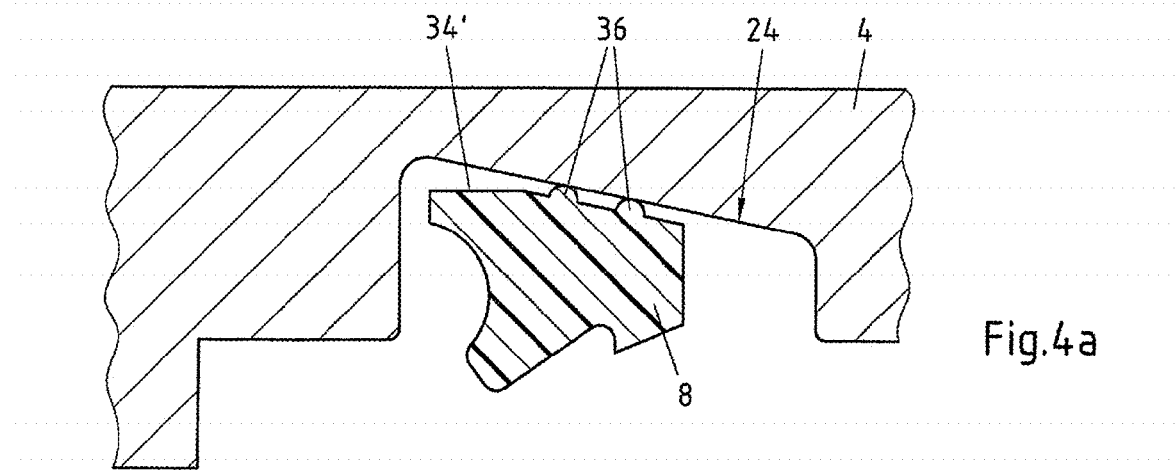
FIGS. 4a-c show the recess and the sealing element from FIG. 1 in sectional view, specifically before the insertion of the pipe, after the insertion of the pipe and after loading with pressure.
Figure 4B:
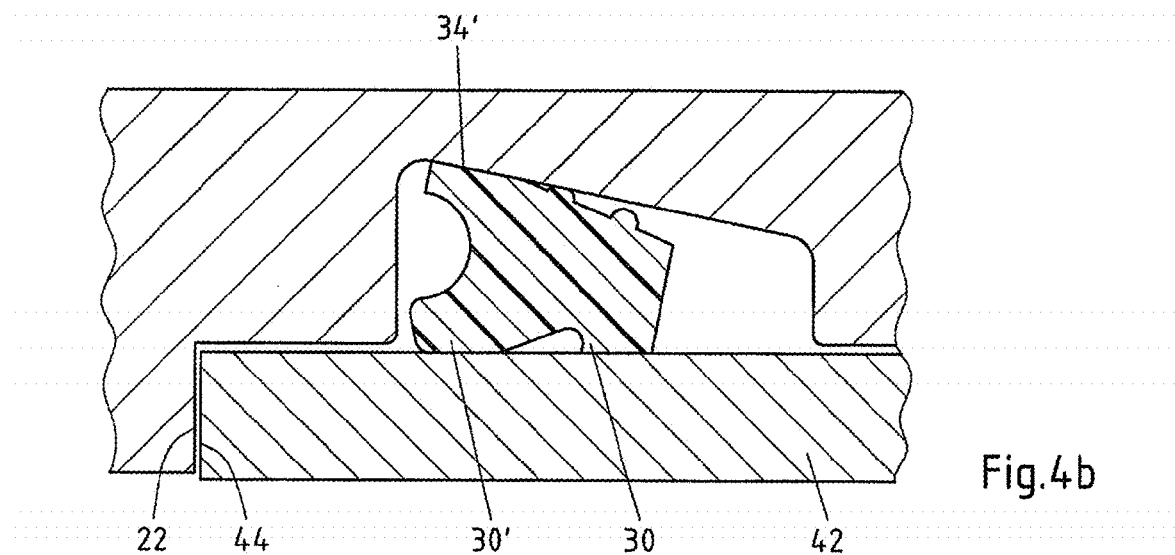
Figure 4C:
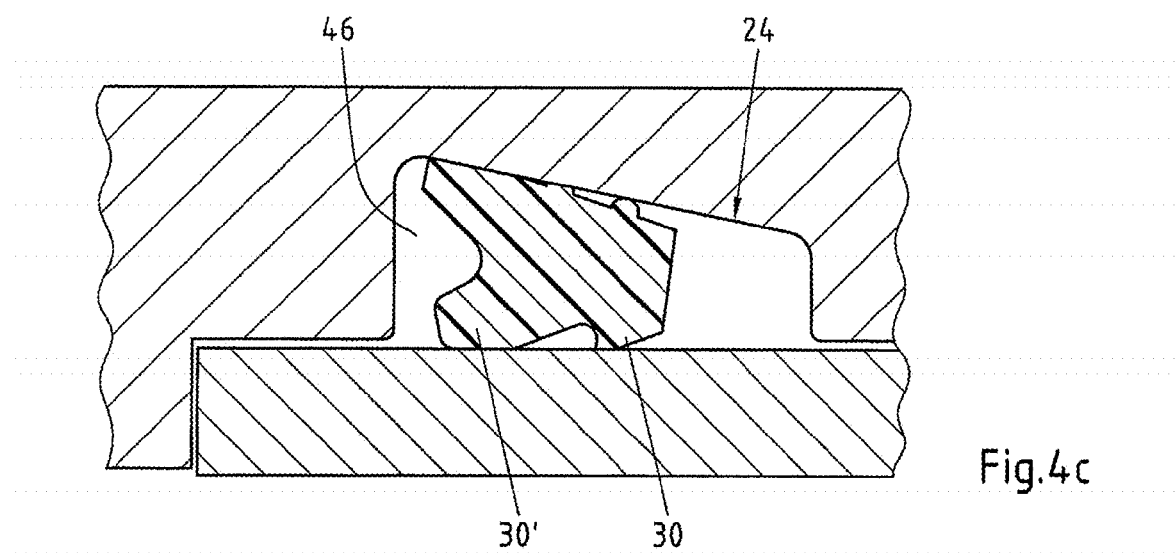

FIGS. 4a-c serve for illustration of the changes in the position and the shape of the sealing element 8 from FIG. 1 in the case of the insertion of the pipe and the loading with internal pressure (on the left).

In FIG. 4a, the sealing element 8 set into the recess 24 of the inner body 4 is illustrated in the initial state, that is to say before insertion of a pipe into the base body 4,6. The projections 36 of the sealing element 8 are brought into bearing contact with the base of the recess 24.

FIG. 4b shows the sealing element 8 in the recess 24 after the insertion of the pipe 42. The pipe 42 is inserted to such an extent that the edge 44 of the pipe 42 is brought into bearing contact with the bearing surface 22 of the inner body 4. During the insertion procedure of the pipe 42, the edge 44 of the pipe 42 temporarily came into bearing contact with the lips 30, 30' of the sealing element 8, so that the sealing element 8 was tilted and the surface 34' was brought into bearing contact with the base of the recess 24. The lips 30, 30' and the entire cross section of the sealing element 8 are radially compressed in FIG. 4b so that the sealing element 8 exerts a force on the base of the recess 24 and the wall of the pipe 42 at the surface 34' and at the lips 30, 30'.

FIG. 4c shows the arrangement from FIG. 4b after a loading with internal pressure (on the left) of 5 bar for example. The pressurized medium conveyed in the pipe 42 penetrates the gap between the bearing surface 22 of the inner body 4 and the edge 44 of the pipe 42 in the space 46 in the recess 24 formed on the left of the sealing element 8. As a result, a pressure acts from the left side onto the sealing element 8. The sealing element 8 was shifted to the right by the force exerted by the pressure, so that it is radially compressed by the tapering of the recess 24, particularly in the region of the lip 30'. As a result, the force exerted by the sealing element 8 on the base of the recess 24 and the wall of the pipe 42 is increased and thus the leak-proofness of the connection is ensured even in the case of increased pressure.

FIG. 5a and FIG. 5b show a longitudinal and a transverse section of the annular cutting element 14 illustrated in FIG. 1. The cutting element has an outer closed ring 48 which serves for the stability and the secure positioning of the cutting element in the base body 4,6. In principle, instead of a ring, a slotted ring, that is to say a C ring can also be used. Inwardly angled projections 50 are arranged on the ring 48, which projections have a cutting edge 52 rounded in the azimuthal direction in each case.

Figure 5C:
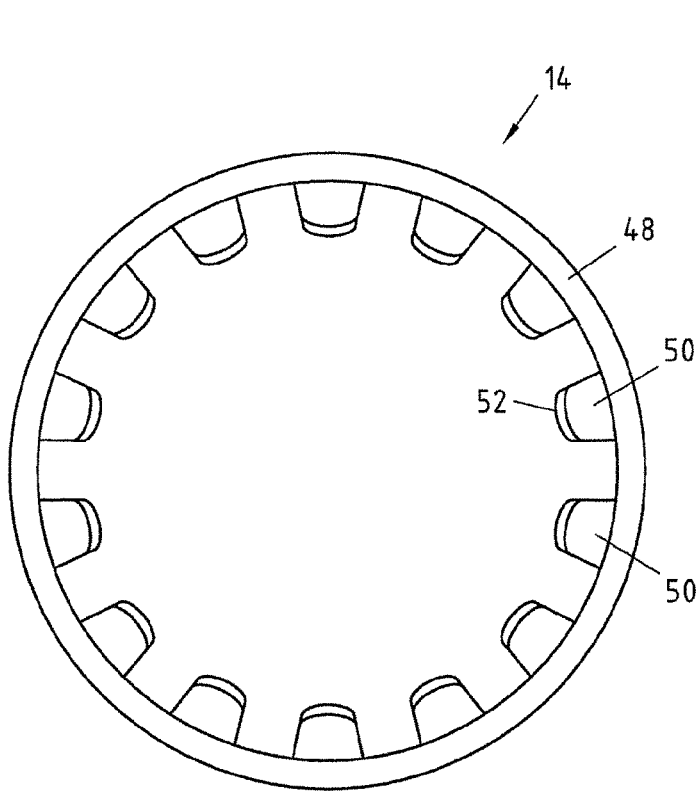
FIG. 5c shows a detailed view of the annular cutting element in sectional view.
Figure 5C:
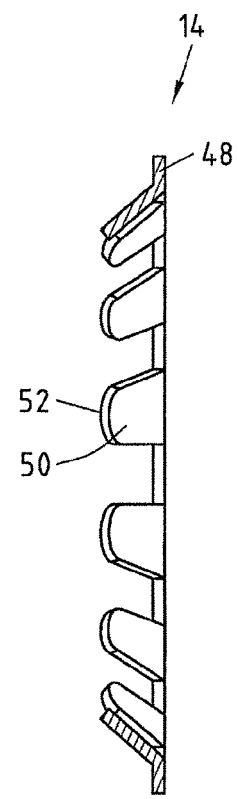
Figure 5C:
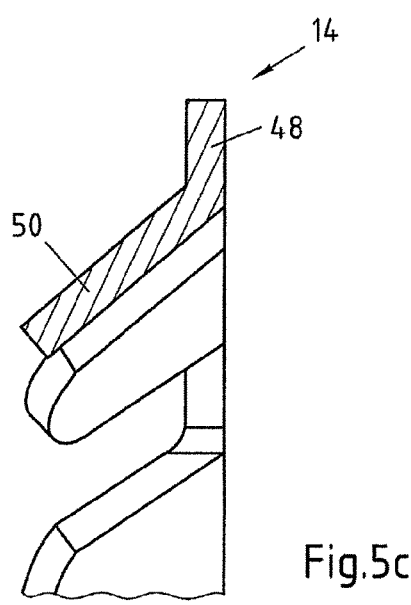

An enlarged section of the sectional view from FIG. 5b is shown in FIG. 5c. The angled shape of the cutting element, due to the radially orientated ring 48 and the inwardly pointing angled projection 50 can be seen clearly here.

Figures 6A, 6B:
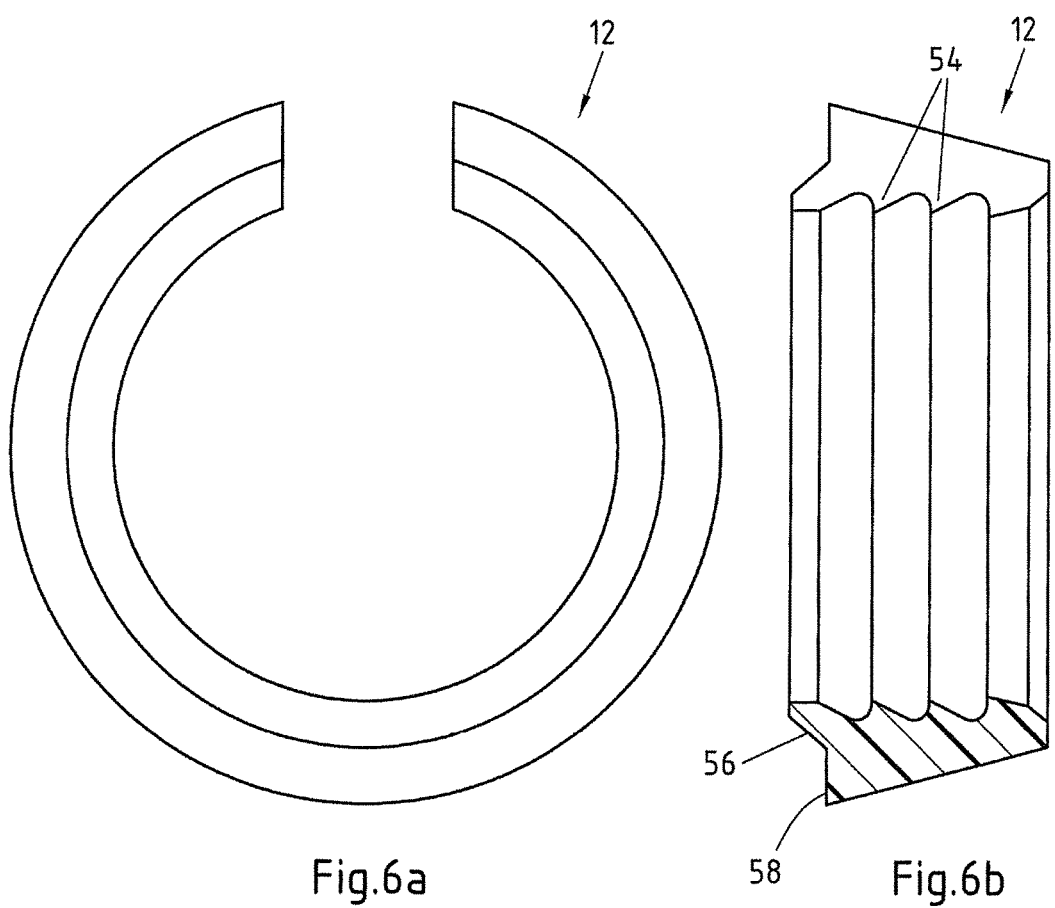
FIG. 6a shows the clamping element from FIG. 1 in a plan view.
FIG. 6b shows the clamping element from FIG. 1 in sectional view.
Figure 6C:
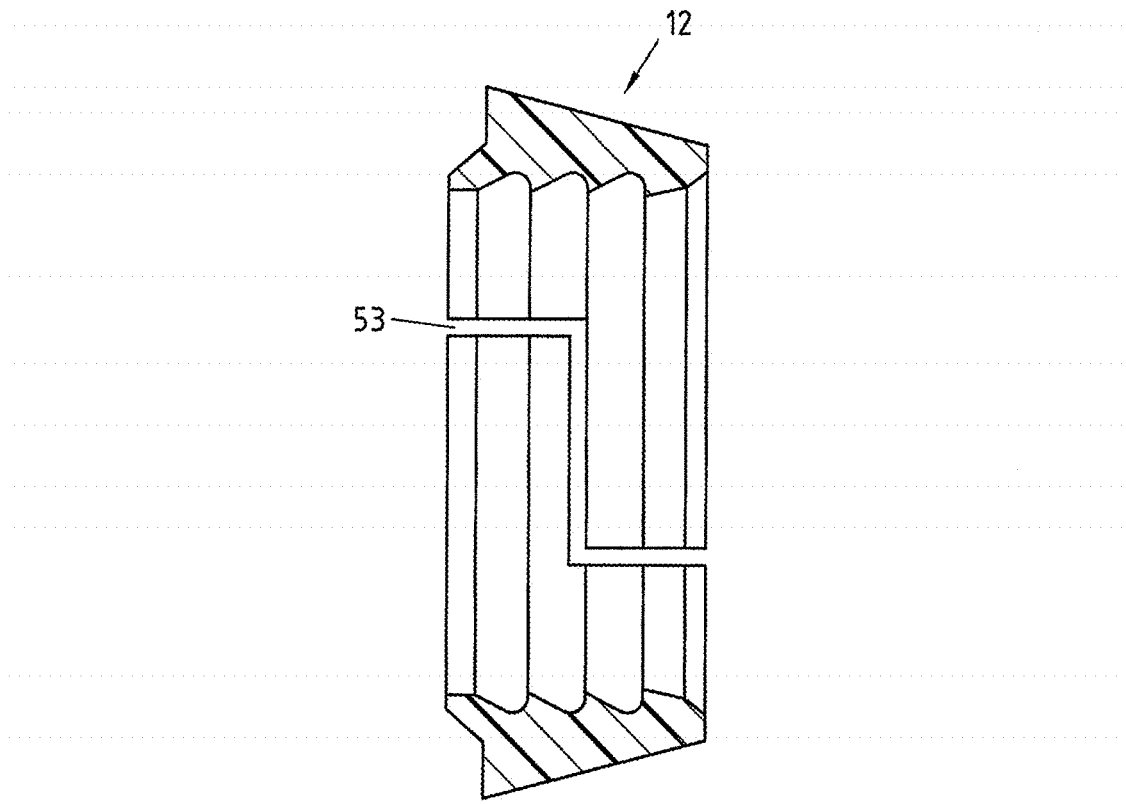
FIG. 6c shows an alternative configuration of the clamping element from FIG. 1 in sectional view and FIG. 6d shows an arrangement according to the invention of the clamping element and the cutting element in a connector.

FIG. 6a and FIG. 6b show a plan view and a sectional view of the clamping element 12 illustrated in FIG. 1. The clamping element 12 is constructed with a C-ring shape, but a configuration as a closed, compressible ring is likewise conceivable. Alternatively, the clamping element can also be provided with a Z-shaped slot 53 as shown in FIG. 6c. The outer cross section of the clamping element 12 has a conical taper. Teeth 54 pointing in the direction of the non-tapered side of the clamping element are constructed on the inside of the clamping element 12. A bearing surface 56 is additionally provided on the non-tapered side of the clamping element 12, which bearing surface forms an angled shape together with the adjacent surface 58 of the clamping element 12.

Figure 6D:
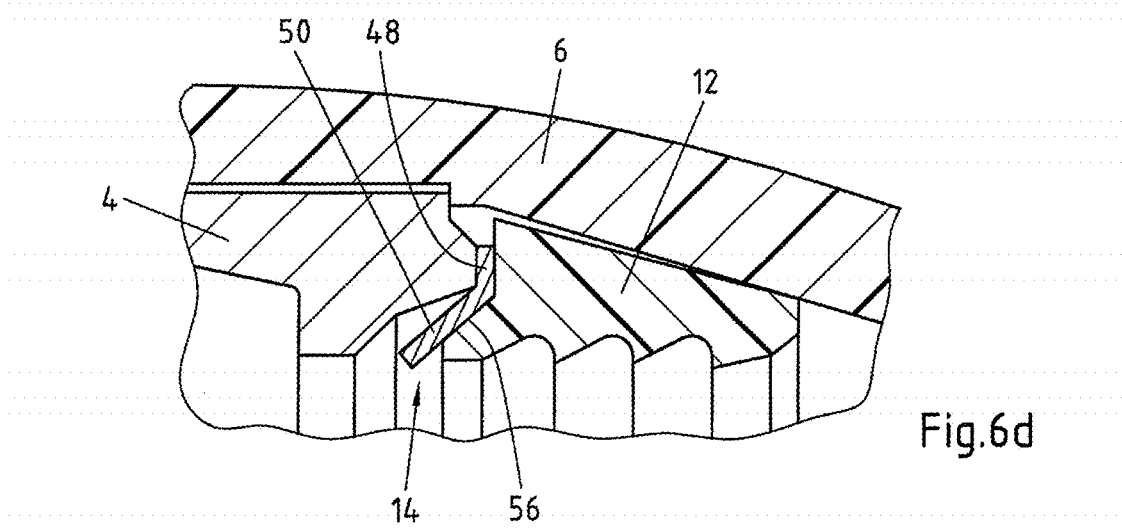

The arrangement of the cutting element 14 and the clamping element 12 in the base body 4,6 from FIG. 1 is shown in FIG. 6d. The ring 48 of the cutting element 14 is arranged in the gap formed between the inner body 4 and the clamping element 12, so that the cutting element is fixed securely in its position in the base body 4,6. The projections 50 of the cutting element 14 are brought into bearing contact with the bearing surface 56 of the clamping element 12. Bending or folding over of the projections and thus damaging of the wall of an inserted pipe in the event of movements of the inserted pipe relatively to the connector is thereby reliably prevented.

The invention claimed is:

1. A connector comprising:
   a base body,
   a sealing element, and
   a fixing means for fixing a pipe inserted into the connector,
   wherein the base body has an insertion opening on one side for the insertion of the pipe and an opposite opening on another side opposite the one side,
   wherein the fixing means has an essentially rotationally symmetrical clamping element and a cutting element,
   wherein at least one tooth formed by a protrusion pointing in a direction facing away from the insertion opening of the base body is formed on an inner side of the clamping element such that the at least one tooth faces the pipe when the pipe is inserted into the connector,
   wherein a cutting edge of the cutting element points in the direction facing away from the insertion opening of the base body,
   wherein the cutting element is arranged on a side of the clamping element facing away from the insertion opening of the base body,
   wherein the cutting element and the clamping element are arranged on a side of the sealing element facing the insertion opening of the base body, and wherein the sealing element is positioned between the inner side of the base body and the pipe when the pipe is inserted into the connector, wherein the at least one tooth comprises a plurality of teeth,
   wherein the clamping element and the base body have conical tapers pointing in a direction facing the insertion opening of the base body such that an inner side of the base body bears directly against an outer side of the clamping element opposite the inner side of the clamping element in a region of the conical tapers,
   wherein the tapers directly contact each other,
   wherein the clamping element has an angled stop surface having a first portion and a second portion with a terminal end, and wherein the terminal end of the first portion of the angled stop surface extends closer to the opposite opening than the second portion of the angled stop surface,
   wherein the cutting element bears against the stop surface.

2. The connector according to claim 1, wherein a cross section of the cutting element has an angled shape.

3. The connector according to claim 1, wherein the cutting edge of the cutting element is constructed on radially distributed projections.

4. The connector according to claim 3, wherein the cutting edge of each radially distributed projection is rounded in an azimuthal direction.

5. The connector according to claim 1, wherein the cutting element has an outer ring in the form of a C-ring.

6. The connector according to claim 1, wherein the clamping element is provided with a Z-shaped slot.

7. The connector according to claim 1, wherein the cutting element is arranged on a side of the sealing element facing the insertion opening.

* * * * *

UNITED STATES PATENT AND TRADEMARK OFFICE
CERTIFICATE OF CORRECTION

PATENT NO. : 9,599,266 B2  
APPLICATION NO. : 12/543777  
DATED : March 21, 2017  
INVENTOR(S) : Christoph Schreckenberg et al.

Page 1 of 1

It is certified that error appears in the above-identified patent and that said Letters Patent is hereby corrected as shown below:

In the Claims

Column 10, Line 29, Claim 1, after "surface," insert -- and --

Signed and Sealed this  
Second Day of May, 2017

Michelle K. Lee  
*Director of the United States Patent and Trademark Office*